United States Patent

[11] 3,545,766

[72] Inventor Lloyd Osborn
Stevensville, Michigan
[21] Appl. No. 656,206
[22] Filed July 26, 1967
[45] Patented Dec. 8, 1970
[73] Assignee V-M Corporation
Benton Harbor, Michigan
a corporation of Michigan

[54] TAPE RECORDER CONTROLS
19 Claims, 8 Drawing Figs.

[52] U.S. Cl. .......... 274/4, 242/203, 242/204
[51] Int. Cl. .......... G11b 15/22
[50] Field of Search .......... 242/201—204, 206—210; 274/4, 11

[56] References Cited

UNITED STATES PATENTS

| | | | |
|---|---|---|---|
| 2,877,958 | 3/1959 | Moore et al. .......... | 242/208 |
| 2,911,162 | 11/1959 | Kyle .......... | 242/203X |
| 3,009,663 | 11/1961 | Armstead .......... | 242/201 |
| 3,130,935 | 4/1964 | Aldridge .......... | 242/208X |

*Primary Examiner*—Harry N. Haroian
*Attorney*—Johnson, Dienner, Emrich, Verbeck & Wagner

ABSTRACT: A tape recording and/or playing machine having a reel, driving means and braking means for the reel, a play-record head, and driving means for the tape together with mechanism and switching means for timely relating the initiation of movement of the reel, the play-record head and the tape driving means with the release of braking means for the reel, for assuring that in transferring from one mode of operation to another the reel will be stopped between said modes before the succeeding mode can be made effective.

Inventor.
Lloyd Osborn.
By. Brown, Jackson, Boettcher & Dienner
Atty's.

PATENTED DEC 8 1970 3,545,766

Inventor:
Lloyd Osborn.
By. Brown, Jackson, Boettcher & Dienner
Att'ys

Inventor.
Lloyd Osborn.
By Brown, Jackson, Boettcher & Dienner
Att'ys.

Inventor:
Lloyd Osborn.
By. Brown, Jackson, Boettcher & Dienner
Attys.

Inventor.
Lloyd Osborn.
By Brown, Jackson, Boettcher & Dienner
Att'ys.

TAPE RECORDER CONTROLS

BRIEF SUMMARY OF THE INVENTION

In tape recording and playing machines which operate with fast tape speeds it is important that the driving of the tape and takeup of the tape be so coordinated that tape is not being fed either substantially faster or slower than it can be wound up by the takeup reel. While this is less of a problem after the machines has started playing or recording, a serious problem may be presented when the tape is first being started up since the tape driving means is adapted to deliver tape at a faster rate than the takeup reel can initially wind it up. The mass of the driving Capstan is so much less than that of the reel, or reel plus tape, that it can deliver tape almost instantaneously at a rate, for example, such as 30 inches per second. However, from a stopped condition the takeup reel cannot immediately reach a corresponding speed which will immediately take up the tape which has been delivered by the Capstan and, as a result, there may be substantial tape spillage. Within limits, such excess tape may be controlled by suitable tape tension levers but at high tape speeds one may run into the problem of having to devote an undesirable amount of space for accommodating the excess tape by such levers.

To assist in avoiding the problem of tape spillage on startup I propose to carefully coordinate the start up of the reel and of the tape driving mechanism so that the use of tape tensioners will not necessitate excessive size of the tensioners or excessive space in which they move. By my invention I provide a clutch disposed between a reel, such as a takeup reel, and its driving means and arrange, through a single actuating mechanism, to operate both the clutch and also the tape driving means, such as a Capstan and pressure roller which are movable relative to each other. In the preferred arrangement the pressure roller together with the play and recording head, or heads, are movable as a unit to engage the tape at the time when the single actuating mechanism is also causing the clutch to engage the driving means with the reel.

To assure prompt startup at fast tape speeds it is also important that there be no drag of brakes associated with the supply and takeup reels. It is therefore another object of my invention to assure by positive mechanical movement a release of the braking structure and to do so in suitable timed relation to initiation of movement of the takeup reel and of the powered drive means for the tape. To this end I employ a single actuating mechanism to control those several movements.

It is also important that the play-record head engage the tape promptly at time of startup and to that end I employ the above-mentioned single actuating mechanism for also controlling the movement of the head.

I provide a linkage between the actuating mechanism and the clutch structure and the brake structure, and in one form of the invention I provide a mechanical linkage between the actuating mechanism and the play-record head and the tape driving means, such as the pressure roller which is adapted to be operatively associated with the Capstan In place of the latter mechanical linkage I may employ a linkage which is electrically responsive to the movement of the single actuating mechanism.

When the machine is in its fast-forward or rewind modes and it is desired to initiate the playing or recording mode a substantial decrease in speed of the tape is necessary, as well as a reverse in direction if the preceding mode has been "rewind." If the reels are not stopped between these modes, either spillage of tape or damaging stretching or breaking of the tape may result. It has been known practice, therefore, to so interlock the controls, which frequently are manipulated by a series of push buttons, that when the machine is in fast-forward, or rewind, pushing of the play button or record button is ineffectual until the stop button has been first depressed.

Even with that arrangement some users will depress the play button or record button so quickly after depressing the stop button that the reels may still be rotating and not yet have reached a stopped condition. As a consequence it is possible that the tape may be damaged or that spillage of tape will result. A further aspect of my invention is to provide means whereby play and record modes cannot be rendered effective until the reels have come to a halt.

To that end I provide means for sensing movement of the reel and tape after the stop button has been depressed. If such movement is sensed, disabling of the play and record modes occurs so long as such movement continues. More particularly I provide a switch in the power circuit for driving the reel and for effectuating drive of the tape and movement of the head, which switch is maintained in an open condition until the reels have stopped. In the illustrated form of this structure the mechanism which senses the continued movement of the reels includes the braking mechanism.

The foregoing and other objects and advantages will be apparent, or will become so from the description which follows, when considered in connection with the appended drawings.

DETAILED DESCRIPTION

Mechanical Construction, Figures 1 through 6

Figure 1:
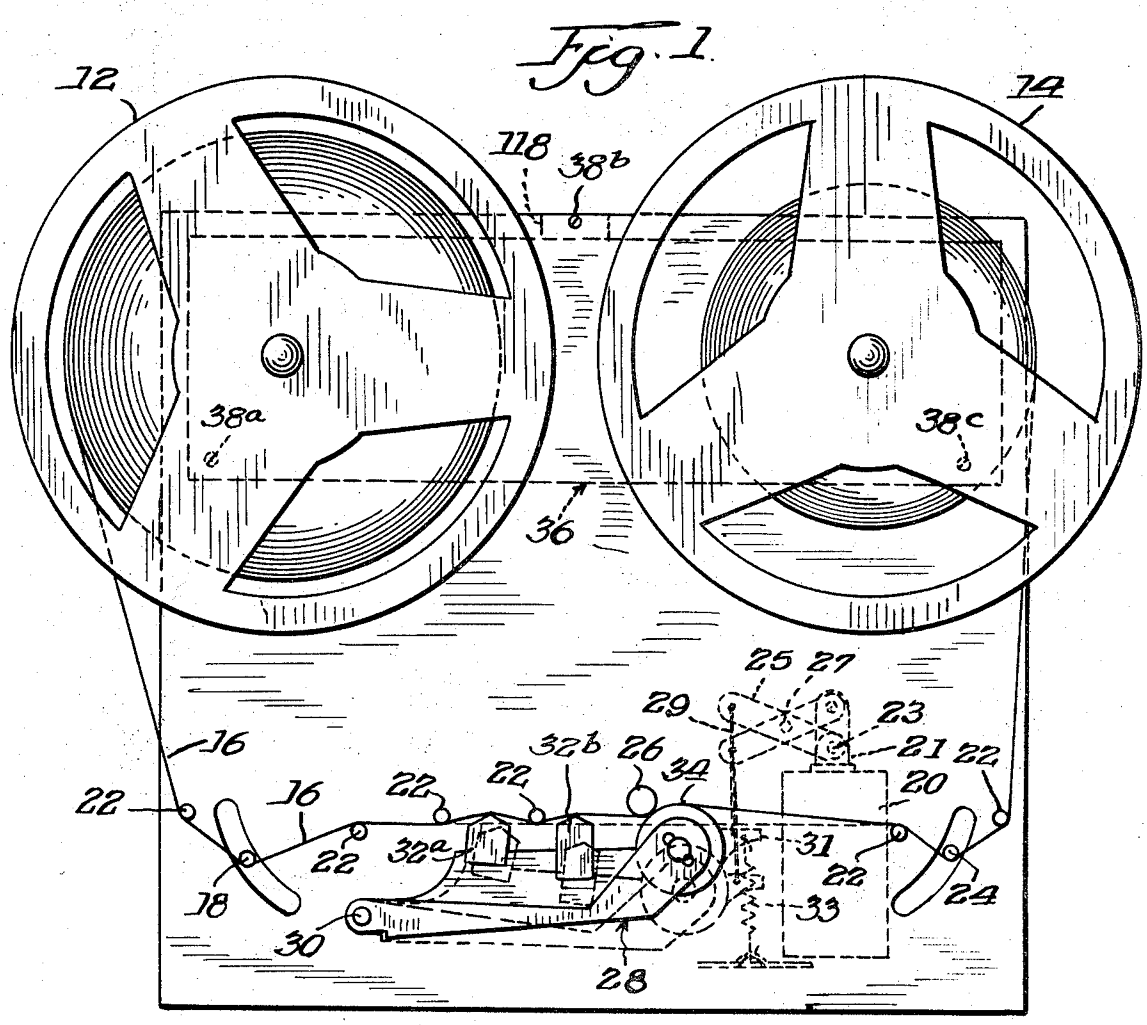
FIG. 1 is a diagrammatic top plan view of a tape transport deck to show the general relation of the parts.

Referring first to FIG. 1, a tape transport deck for a tape recording and playing machine is indicated generally by the numeral 10. Supported above the deck for rotation is a reel which will be designated as the supply reel 12. Another reel similarly supported is a takeup reel 14. These designations are chosen since they are the customary terms used for the reels in the "record" and "play" modes. It will be appreciated, however, that in the "rewind" mode, reel 14, the so-called "-takeup" reel, will serve as the tape supply reel and at that time reel 12 will become a takeup reel.

The tape 16 is shown extending from supply reel 12 past a movable guide pin 18 carried on a tape tensioning device (not shown) and past a series of fixed guides 22 and past another movable guide pin 24 of another tensioning device and on to the takeup reel 14. Suitable tensioning devices are illustrated in the copending U.S. Pat. application of John F. Arent, filed Mar. 16, 1967, Ser. No. 623,717. Capstan 26 lies between two of the guides 22, and movable head bar 28, pivoted at 30, carries heads 32*a* and 32*b* and pressure roller 34. A solenoid 20 adjacent the free end of the head bar 28 has an armature 21 which is pivotally connected, as at 23, to one end of a lever 25 which has a fulcrum or pivot point 27. The other end of lever 25 is pivotally connected to a link 29 the other end of which is pivotally connected to an extension 31 on the head bar 28. Head bar 28 is resiliently urged to its dotted line position by a spring 33. Shown in dotted lines, a subassembly 36 is supported from the deck 10 by screws 38*a*, 38*b* and 38*c* and lies beneath the deck.

Figure 2:
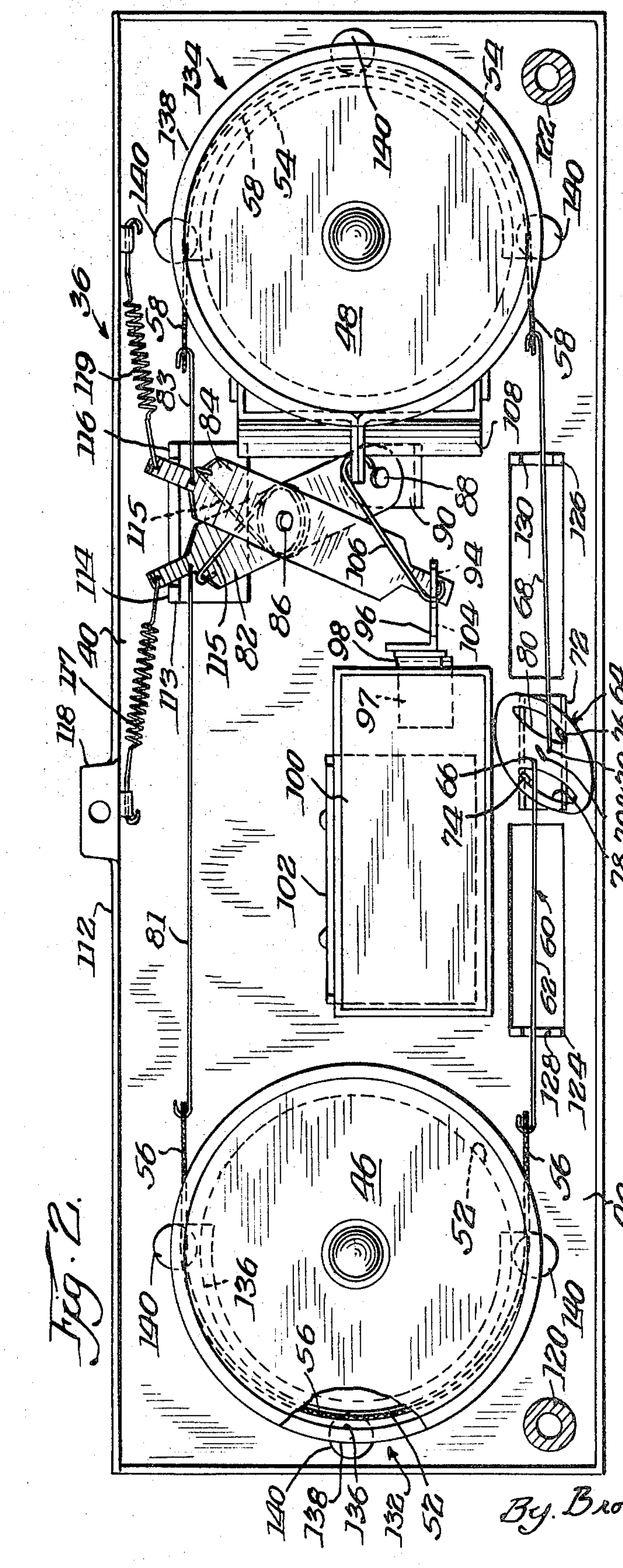
FIG. 2 is an enlarged top plan view of braking apparatus, clutch actuating mechanism and associated structure, certain portions being broken away for a clearer disclosure and with the assembly separated from the deck of FIG. 1.
Figure 3:
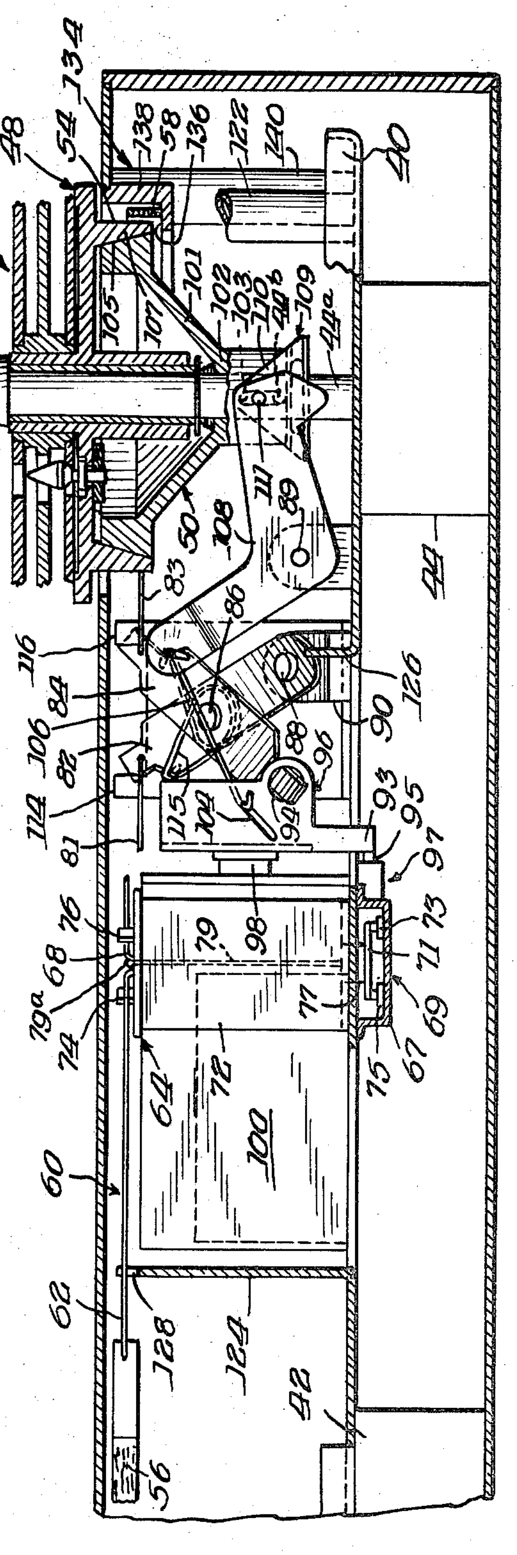
FIG. 3 is a side elevation of the structure of FIG. 2 with certain portions being shown in section and other portions being broken away.

Referring then to FIGS. 2 and 3, the subassembly 36 includes a subbase 40 beneath which are supported the motors 42 and 44 for driving the reel supports 46 and 48 for the reels 12 and 14, respectively. Motor 42 is directly coupled to drive reel supporting member 46 while motor 44 is coupled to a reel support member 48 through a clutch mechanism, indicated generally by the reference numeral 50. For details of a reel supporting member such as member 48 see my copending U.S. Pat. application, Ser. No. 602,333, filed Dec. 16, 1966. The reel supporting members 46 and 48 having braking hubs 52 and 54, respectively, and are adapted to be engaged by flexible brake bands 56 and 58, respectively, for braking the reel supporting members. Bands 56 and 58 are each interconnected by an end to each other by a linkage means indicated generally by the numeral 60. Linkage means 60 comprises a wire 62 connected to brake band 56 and to the force dividing link 64 at a pivotal aperture 66, and a wire 68 connected to brake band 58 and to the link 64 at a pivotal aperture 70.

Link 64 rests on the upper edges of an upstanding U-shaped bracket 72 which is fastened to subbase 40. The upper edges of bracket 72 have a pair of spaced-apart upwardly extending tabs 74 and 76 a set at an angle to the arms of bracket 72 and serving as fulcrums for link 64. Link 64 has a pair of spaced apart openings 78 and 80 through which the tabs 74 and 76 extend, respectively.

Beneath subbase 40 and under the U-shaped bracket 72 is a switch housing 67 which contains an electrical switch 69 (sometimes hereinafter referred to as the "brake switch" comprising a rotatable switch arm 71 having contacts at each end adapted to bridge terminals 73 and 75 to complete a normally closed circuit. Switch arm 71 is connected to an insulating member 77 which also serves to provide a bearing in the subbase 40 and bracket 72 and is connected with a wire 79 which has an upper end 79*a* which is connected with the force dividing link 64, as by being inserted through two apertures in said link. Switch 69 when opened serves to open the circuit to the solenoid 100 and thereby causes the clutch mechanism 50 and the pressure roller 34 to be rendered ineffective for respectively driving the reel 14 or driving the tape by Capstan 26.

Opposite ends of the brake bands 56 and 58 are pivotally connected by links 81 and 83 with a pair of levers 82 and 84, respectively, at their one ends and the levers are pivotally interconnected by a pivot pin 86. The lower end of lever 82 is pivotally connected by a fixed pivot pin 88 to an angularly upturned tab 90 formed from subbase 40 and the lower bent end of lever 84 is disposed in an opening 94 in an angle bracket 96 which is mounted on the armature 98 of a solenoid structure, indicated generally by the reference numeral 100. An alternate form of connection between the lower end of lever 84 and armature 98 is shown in the diagrammatic views of FIGS. 4, and 5 and 6 wherein a link 99 directly connects lever 84 with the armature. Solenoid structure 100 is fixed to a flange 102 formed from the subbase 40. A slot 104 in bracket 96 receives one end of a link 106 and the other end of link 106 is connected with an operating mechanism for the clutch structure, the operating mechanism being a pair of bellcrank levers designated generally by the numeral 108. Such connection of clutch operating mechanism 108 with the armature 98 permits the solenoid 100 to serve as an actuating mechanism for controlling movement of the clutch in proper timed relation with the application and removal of the brakes.

Figure 4:
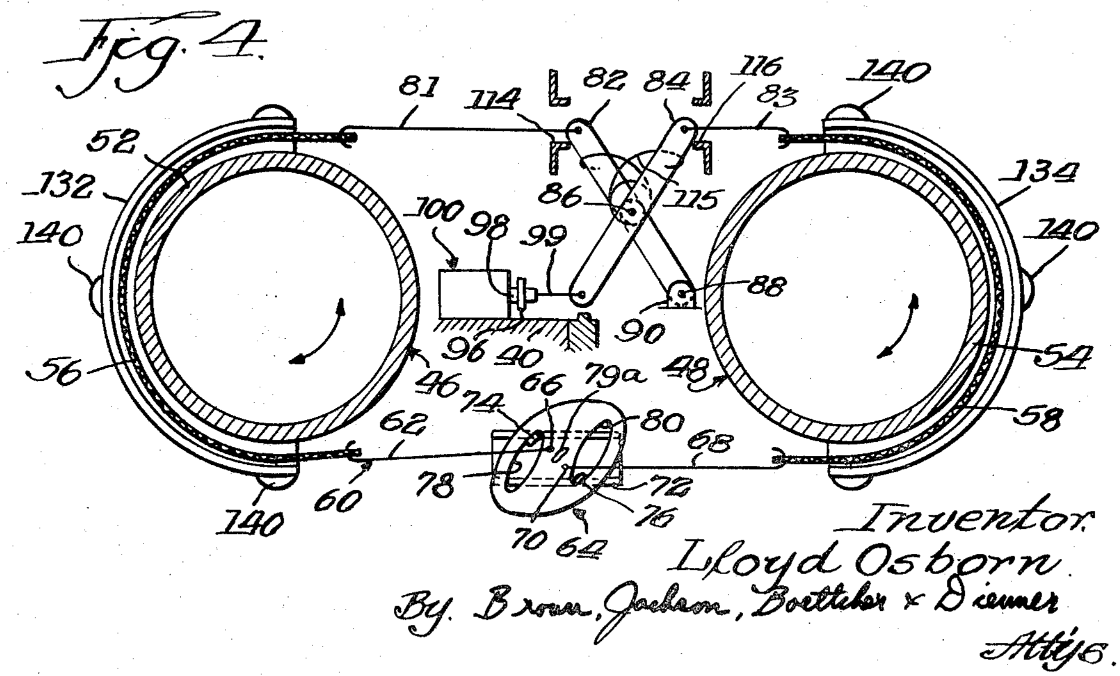
FIGS. 4, 5 and 6 are diagrammatic showings, respectively, of the braking apparatus in its nonoperating condition (such as may exist when the reels are rotating); the braking apparatus applied to the rewinding mode of the tape recorder; and the braking apparatus applied to a forward wind mode of the tape recorder.
Figure 5:
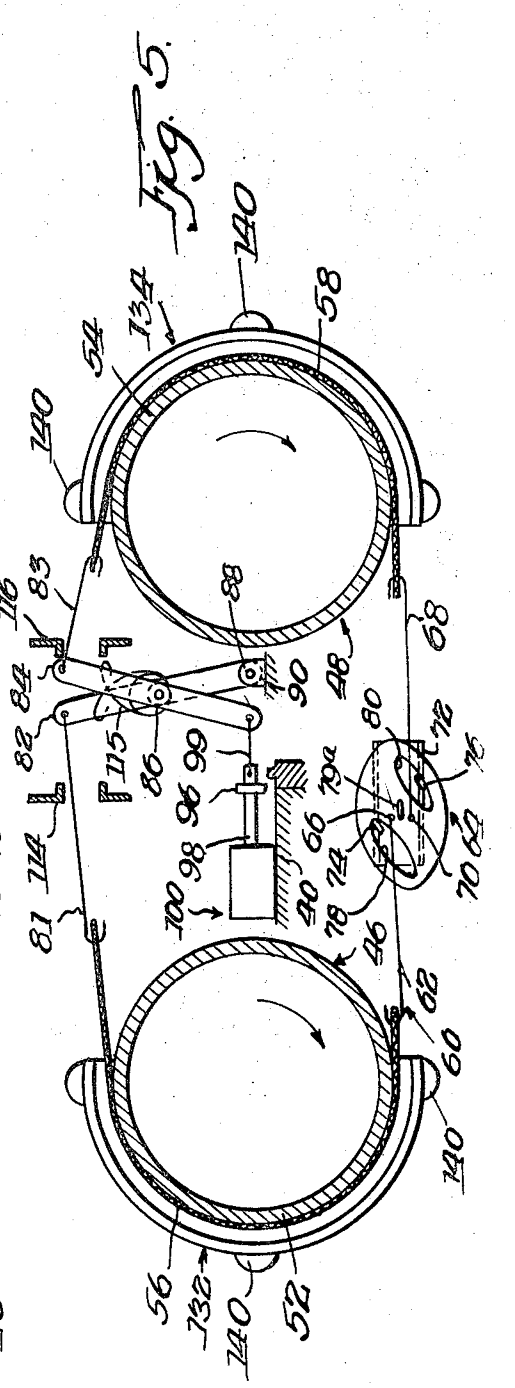
Figure 6:
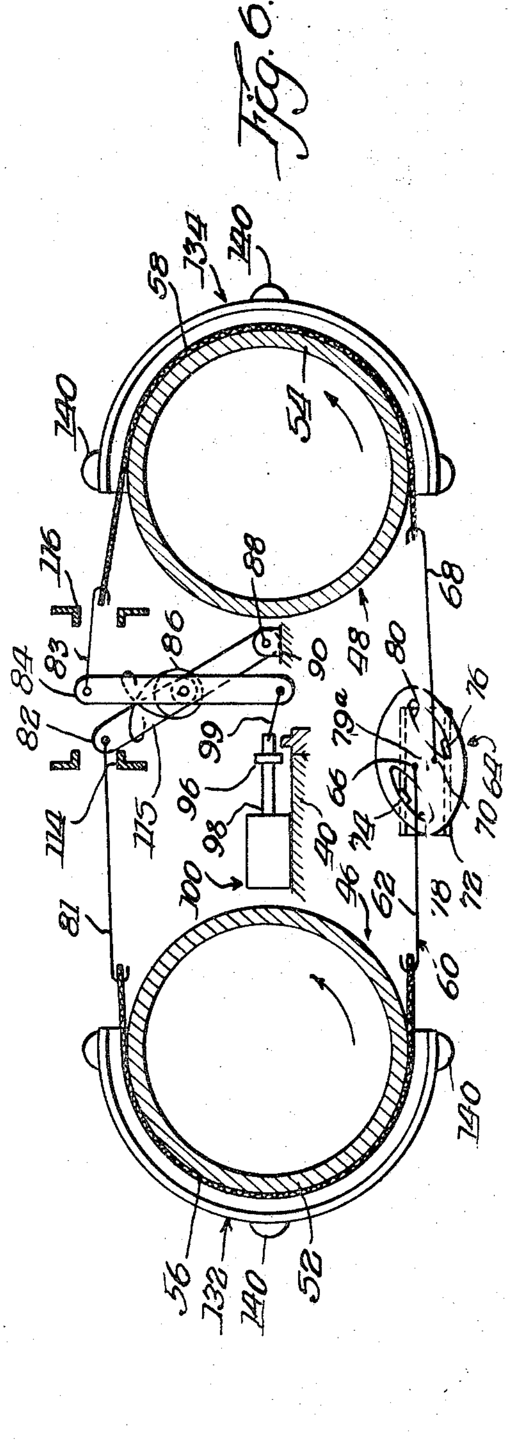

A spring 115 normally biases the levers 82 and 84 toward each other so as to cause the brake bands 56 and 58 to be drawn against the brake hubs 52 and 54. As is shown in FIGS. 4, 5 and 6 spring 115 encircles the pivot pin 86 and has its opposite ends bearing against the levers 82 and 84 to bias them toward each other. However, so long as solenoid 100 is energized and holds its armature 98 inwardly (to the left as viewed in FIGS. 2 through 6), said armature pulls the lower end of lever 84 to the left and causes the upper ends of levers 82 and 84 to separate thereby overcoming the braking action provided by the biasing spring 115.

Along the upper margin of a vertically extending flange 113 a notch is provided whereby a pair of shoulders 114 and 116 is formed against which the outer bent ends of levers 82 and 84 can abut during application of the brake bands to the braking hubs in a manner which will be described below. Light retraction springs 117 and 119 connect respectively to brake levers 82 and 84, and the other ends of the springs are connected to the wall 112 of subassembly 36. After the brakes have been applied and have brought the reels to a stop, springs 117 and 119 assist in centering the levers 82 and 84 between the shoulders 114 and 116 so that switch 69 will reclose. Springs 117 and 119 also serve when the brakes are not applied, to move the brake bands away from the braking hubs 52 and 54.

The lower edge of bracket 96 has a downward extension 93 (FIG. 3) passing through a slot (not shown) in the subbase 40 and engageable with a spring loaded plunger 95 of a switch e mechanism 97 which is sometimes hereinafter referred to as the "head switch." In FIG. 3, the position of the plunger 95 is such that a circuit is closed to the solenoid 20, with the result that solenoid 20 (FIG. 1) is energized and the head bar 28 is moved to its solid line position of FIG. 1 with the pressure roller 34 engaging the tape 16 against the Capstan 26 so that the tape is driven. When solenoid 100 is not energized its armature 98 is moved to the right, as viewed in FIG. 3, because of the force of spring 115 which causes lever 84 to move counterclockwise, thereby drawing bracket 96 to the right. When bracket 96 moves to the right, spring loaded plunger 95 follows part way until it reaches a position wherein it causes the switch 97 to be opened and the circuit to solenoid 20 to be thereby opened. The head bar 28 then moves to the dotted lines position of FIG. 1 under the influence of spring 33. From this it can be seen that solenoid 100 and its armature 98 can serve as a single actuating means for timely relating the movement of the reel 14, the head bar 28 and tape driving pressure roller 34 and associated Capstan 26 with the application or release of the brakes for the reels 12 and 14.

An outwardly turned tab 118 at the upper margin of integrally 112 of subbase 40 and upstanding posts 120 and 122 at corners of subbase 40 are apertured and threaded to receive screws 38*a*, 38*b* 38*c* so that the subassembly 36 can be secured beneath deck 10. Formed from the subbase 40 and bent upwardly therefrom are two strap portions 124 and 126 which have guide notches 128 and 130 can also serve as a rest for the links 62 and 68 of the brake linkage 60. The bases of the notches 128 and 130 can also serves as a rest for the links 62 and 68 when the brake bands are in a position of rest. Partially encircling the braking hubs 52 and 54 are supporting structures 132 and 134, respectively. Each of these comprises a curved shelf 136 and an integrally formed curved wall 138 which are adapted to support and position the brake bands 56 and 58, when they are in their position of rest, so that they will be adjacent to the hubs and ready to be applied rapidly. A plurality of integral supporting legs 140 connects each supporting structures 132 and 134 with the subbase 40.

The clutch mechanism which is indicated generally by the reference numeral 50 comprises a movable clutch member 101 which is drivingly connected to the drive shaft 44*a* of motor 44 by a drive pin 44*b* which is secured in the hub portion 102 of clutch member 101 and passes diametrically through an axially elongated slot 103 which extends through the drive shaft 44*a*, thus permitting limited axial movement of the clutch member 101 into and out of engagement with clutch surface 105 of the hub 107 of the reel supporting member 48. For moving the clutch member 101 into clutching engagement, there is provided a clutch operator 109 which is generally U-shaped and is pivotally connected adjacent the free ends of its opposite arms (e.g. see arm 110 and its pivotal connection 111) with arms of bellcrank levers 108 which levers at the ends of their other arms are connected to the common link 106. There is an opening in the bight portion of the U-shaped clutch operator 109 which permits it to fit about the drive shaft 44*a* without contacting the shaft.

Circuitry Figures 1 through 6

Figure 7:
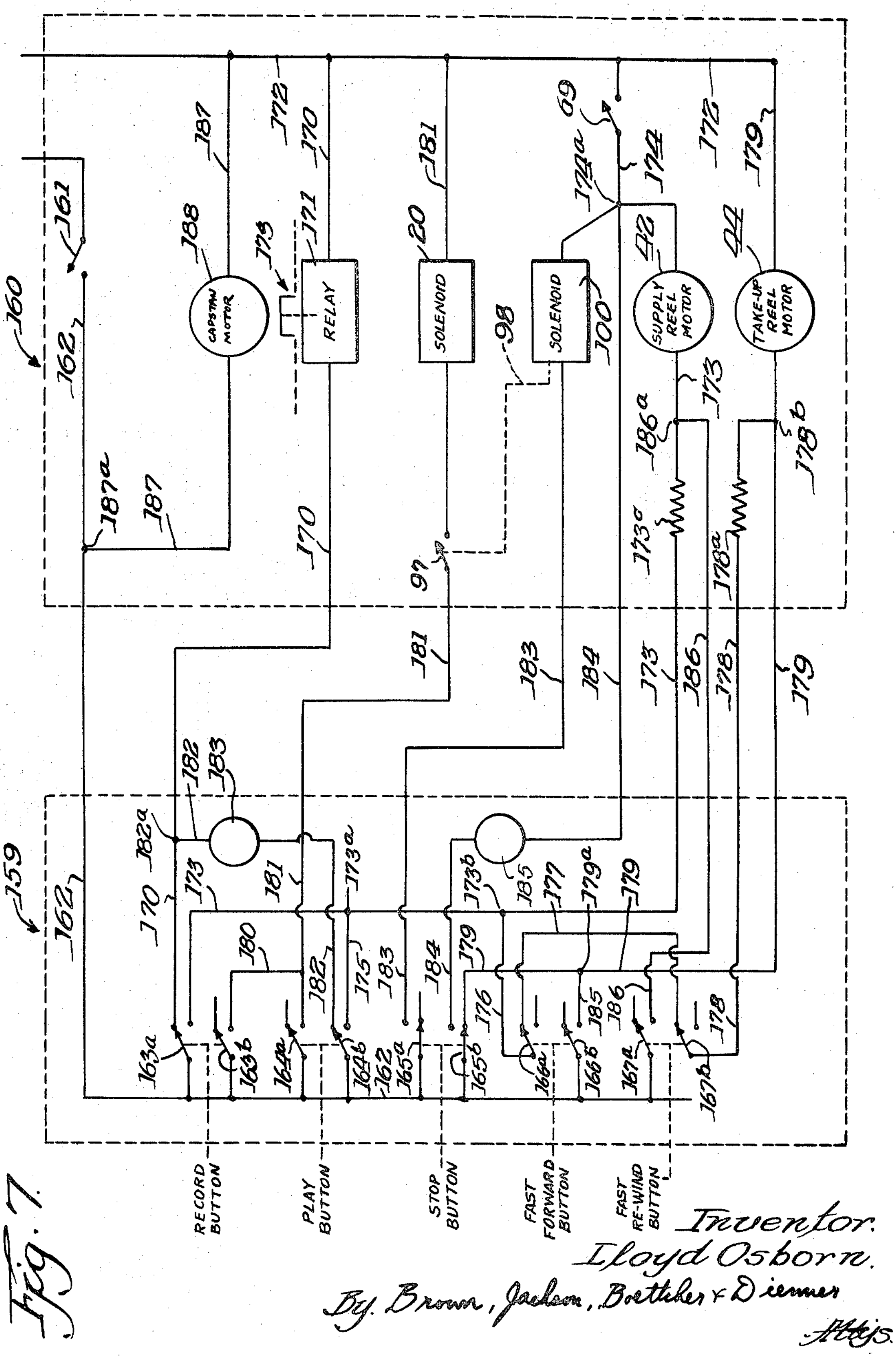
FIG. 7 is a wiring diagram showing wiring arrangements suitable for use with the illustrated mechanism of FIGS. 1 through 6.

Referring to FIG. 7, the dotted outline and its contents, indicated generally at 159, diagrammatically represent the push button controls either at, or at a distance from, the tape deck. These controls include the "record" button, "play" button, "-stop" button, "fast-forward" button and "fast-rewind" button. The dotted outline and its contents, indicated generally at 160, diagrammatically represent certain of the operating structures carried by the deck. The two units 159 and 160 together disclose a circuit diagram for the structures illustrated and described in connection with FIGS. 1 through 6. The various conductors extending between the units 159 and 160 could be grouped together as a cable. For brevity the word "lines," or "line," will be used instead of "conductors" or "conductor" in some of the following description.

The circuit diagram is shown with the deck switch 161 (which is the main on-off switch for the machine) in an open position in the main supply line 162. The main return line 172, together with main line 162 are adapted to be connected to a suitable source of current. The circuit, as shown, has the stop button depressed, or "in," while all of the other buttons are "out," as though the machines had been stopped from a prior operation. In a known manner, the five push buttons are so interrelated or interlocked that when one button is depressed it causes any prior depressed button to be move to its "out" position, with corresponding changes in circuit connections. The main incoming line 162 is connected with five double-pole switches which are respectively operated by the five buttons described above. The double-pole switches are switches **163*a* and 163*b* operable by the record button, 164*a* and 164*b* operated by the play button, 165*a* and 165*b* operated by the stop button, 166*a* and 166*b* operated by the fast-forward button, and switches 167*a* and 167*b*** operated by the fast-rewind button.

With the control buttons in the position shown, switch **163*b* makes no circuit connection but switch 163*a* of the record button connects the main line 162 with line 170 which extends to a relay 171 and from there to the return line 172. Numeral 173 indicates the presence of an appropriate switching electronic circuit for the play-record head and forms no part of the present invention and so is indicated merely fragmentary. When the record button is depressed its switch 163*a* then connects main line 162 with line 173 which extends through a resistance 173*c* (200 ohms, for example) to the supply motor 42 for the supply reel 12 and thence to a connection with line 174 at the junction 174*a*. Line 174 extends through the "brake switch" 69, which is normally closed, to the return line 172. The brake switch is the switch that senses continued movement of the reels and the tape after the brakes have been applied. There are other connections to line 173. For example, line 175 which is adapted to be connected with the main line 162 if the play button is depressed (but through switch 164*b*) has a junction at 173*a* with line 173. A further junction with line 173 is at 173*b* where line 176 connects and extends to switch 166*a* of the fast forward button which, as shown, is closed and therefore connects line 176 to 177 which extends then to switch 167*b* of the fast rewind button and through it to line 178 and thence through a resistance 178*a* (50 ohm, for example) to a junction at 178*b* with line 179. Referring again to the record button, its switch 163*b*, when closed, connects the main line 162 with line 180, which through its connection with line 181 permits current to flow through line 181 to the normally open "head switch" 97 which is the switch operated by movement of armature 98 of solenoid 100. Beyond switch 97 is solenoid 20 which is adapted through its armature 21 (FIG. 1) to move the head bar 28 to an operative position when the armature is attracted by the energized solenoid 20. From solenoid 20 line 181 extends to the return line 172**.

Switch **164*a* of the play button, as shown in FIG. 7, is making no circuit connection. Switch 164*b*, however, is connected with line 182 through an indicator light 183 to a junction point 182*a* with the line 170. With the stop button depressed, as shown in FIG. 7, its switch 165*a* completes no circuit. Switch 165*b* connects the main line 162 to line 179 which extends to the motor 44 for the takeup reel 14 and thence to the return line 172 without any intervening resistor in the line. When any other button than the stop button is next depressed, the interconnection and interlock arrangements among the five buttons will cause the stop button to be moved to its "out" position thereby shifting the switches 165*a* and 165*b* from their FIG. 7 positions. In such event, switch 165*a* connects the main line 162 with the line 183 which extends to the solenoid 100 and thence to junction point 174*a* for connection with line 174 and thence through the normally closed brake switch 69 to the return line 172. Switch 165*b* is at that time connected with line 184 which extends through an indicator light 185 to the junction point 174*a* and thence through line 174 and switch 69 to the return line 172**.

As shown in FIG. 7, switch **166*b* completes no electrical circuit while switch 166*a* of the fast-forward button completes a circuit between lines 176 and 177. If the fast-forward button is depressed, its switches 166*a* and 166*b* are moved from the position shown in FIG. 7 so that switch 166*a* opens the circuit between lines 176 and 177 and switch 166*b* closes the circuit between the main line 162 and line 185 which has a connection at junction point 179*a* with the line 179 leading to the takeup reel motor 44 and from there to return line 172**.

As shown in FIG. 7, switch **167*a* of the fast-rewind button completes no electrical circuit while switch 167*b* makes a connection between lines 177 and 178. If the fast-rewind button is depressed, its switch 167*a* is moved to connect the main line 162 with a line 186 which extends to a junction point 186*a* with line 173 and thence to motor 42 for the supply reel 12 and, by way of line 174 and the normally closed switch 69, to the return line 172. The switch 167*b* is switched to open the circuit between lines 177 and 178** when the fast-rewind button is depressed.

Capstan motor 188 is shown connected at all times between the main line 162 (beyond the deck switch 161) and the return line 172 by a line 187. This means that the Capstan motor will be running at all times so long as deck switch 161 is closed and regardless of which of the five pushbuttons is depressed, including the stop button.

If the user of the tape recording and playing machines closes the deck switch 161, with the circuit as shown in FIG. 7, and then depresses the play button, for example, power will be supplied through switch **164*a* from the main line 162 and through line 181 to the normally-open head switch 97. Through switch 164*b* of the play button, line 162 will be connected with line 175 and thence through two paths to return line 172. One path is from line 173 to line 176 at junction 173*b* and through switch 166*a* to line 177 and thence through switch 167*b* to line 178 and through the resistance 178*a* to the motor 44 for the takeup reel, and thence to the return line 172. This circuit introduces a resistance to the takeup motor so that its torque is reduced to the desired torque for winding the tape, for example, 4 ounce inches. The second path is through line 173, beyond junction 173*b*, to resistance 173*c* and then to motor 42 for the supply reel 12 and thence through line 174 and brake switch 69 to return line 172. This causes the supply motor 42 to act as a braking motor to cause the desired amount of tension to be supplied to the tape as it is pulled by the Capstan 26, between guides 22 and heads 32*a* and 32*b*. At the same time, through switch 163*a* of the record button, power will be supplied from line 162 through line 170 to the relay 171 for actuating the electronic circuitry for the head. Additionally Capstan motor 188 will be driving the Capstan 26** at full speed.

When the play button has been depressed it will cause the stop button to move to its "out" position thereby shifting its switches **165*a* and 165*b*. Switch 165*a* will close the circuit between the main line 162 and line 183 leading to the solenoid 100 and thence through junction 174*a* and line 174 and the closed brake switch 69 to the return line 172. Energizing the solenoid 100 causes it to attract is its armature 98 (FIGS. 1** through 6) thereby causing, in sequence, the brakes to be released, and the clutch 50 to be actuated to connect the drive shaft 44*a* of motor 44 with reel supporting member 48 for takeup reel 14. At this time also the movement of the armature 98 of solenoid 100 will cause a closing of the head switch 97, whereupon a circuit can be completed through solenoid 20 and line 181 to the return line 172. Energization of solenoid 20 will cause the head bar 28 to be drawn counterclockwise as viewed in FIG. 1, so that the pressure roller 34 will engage the Capstan and tape 16, thereby causing the tape to be driven, and causing the heads 32*a* and 32*b* to engage the tape. Clutch 50 preferably is engaged to the same time, or slightly before, pressure roller 34 engages the Capstan. At this same time, switch 165*b* of the stop button will have moved to close a circuit between the main line 162 and line 184 and thence through the indicator light 185 and line 174 and the closed brake switch 69 to the return line 172.

Briefly, when the play button is depressed and the deck switch is closed, the brakes 56 and 58 for the reels 12 and 14 will be released followed by engagement of the clutch 50, driving of the tape by the Capstan 26 and pressure roller 34 and engagement of the heads 32*a* with 32*b* with the tape 16. The sequencing of these functions is under the control of the solenoid 100 and its armature 98.

Assuming next that the deck switch 161 is depressed and that the user presses the record button, substantially the same circuits will be established as in the case of the pushing of the play button. The slight differences are only the following: line 181 to head switch 97 and solenoid 20 is connected with the main line 162 through switch 163*b* and line 180 rather than through switch 164*a*. Line 173 is connected with main line 162 through switch 163*a* instead of through switch 164*b*. Otherwise, the circuitry is the same and the sequence of steps is the same in releasing the brakes and in applying the clutch 50 and rendering effective the tape drive through the pressure roller 34 and Capstan 26 and the engagement of the play-record head to the tape 16.

Assume next that the machine is not in a "running" mode but that again the stop button is depressed and all the other buttons are out, and that the fast-rewind button is now depressed. That will result in the stop button being automatically put in its out position so that its switches 165*a* and 165*b* will move from the positions shown in FIG. 7 and make contact with the lines 183 and 184 through switches 165*a* and 165*b*, respectively. When the fast-rewind button is depressed, its switch 167*a* connects the main line 162 with line 186 which leads directly to the supply motor 42 without passing through any resistance such as resistance 173*c* in line 173. Therefore, the supply motor which runs in a direction adapted for rewinding the tape will run at full speed. Switch 167*b* of the fast-rewind button will disconnect from line 177 and will not complete any other circuit. Under these circumstances, power to the motor 44 for the takeup reel 14 is disconnected since there is no connection between the main line 162 and takeup motor 44 either through lines 178 or 179. While a circuit will be completed from main line 162 through switch 165*a* to solenoid 100 which will be actuated because the normally closed brake switch 69 is closed, the takeup reel 14 will not be driven by the takeup motor 44 but will merely unwind in response to the pull on tape 16 by the supply motor 42. While relay 171 will be energized from the main line 162 either through switches 163*a* or 164*b* by way of line 170, this will have no effect on the fast-rewind operation. Although the solenoid 100 is actuated and causes actuation of the head switch 97, there is no connection from the main line 162 to line 181 and the head switch so there is no movement of the head bar 28 toward the tape or of pressure roller 34 toward the tape.

Assume now that the rewind mode is proceeding with the tape rapidly being unwound from reel 14 and being returned to the supply reel 12, and the user desires to stop the rewinding and to start the play or record mode. As mentioned above, the various control buttons are interlocked in a known manner so that the user cannot depress the play button when the rewind button has been depressed until the stop button is first depressed. Assuming now that the user does press the stop button and then immediately presses the play button before the reels have been brought to a full stop by the brakes, brake switch 69 which is normally closed will now be open since the brake linkage 60 will pull on the link 64 and give it a pivotal movement with the result that link 64 will cause the wire 79 (FIG. 3) to rotate the brake switch 69 to a position where the terminals of the movable switch member 71 do not engage the contacts 73 and 75. The amount of movement resulting in opening of switch 69 is very small. Therefore, when the brakes have brought the reels to a stop, the switch will reclose and then the play mode can be rendered effective. It will be seen, however, that so long as brake switch 69 (FIG. 7) is open, power from main line 162 through switch 164*b* of the play button and through lines 175, 173 will not energize the motor 42 because the circuit is interrupted between the supply motor 42 and the return line 172 at the brake switch 69. Similarly, the same brake switch 69 when in open position interrupts the circuit which includes the solenoid 100 so that the brakes will not be released and the solenoid's armature 98 will not close the head switch 97 and, hence, the solenoid 20 will not actuate the play-record head or pressure roller and the tape will not be driven.

Therefore, a user who too hastily depresses the play or record buttons after pushing the stop button to discontinue either a rewind mode or a fast-forward mode, will be unable to cause tape spillage or excessive tension on the tape by reason of the brake switch 69. As may be readily seen from FIG. 7, brake switch 69 functions in a similar manner in the event that the user has had the fast-forward button depressed and then pushes the stop button and then very quickly thereafter pushes the play or record button. Until the reels come to a stop as sensed by the link 64, the switch 69 will remain open.

Figure 8:
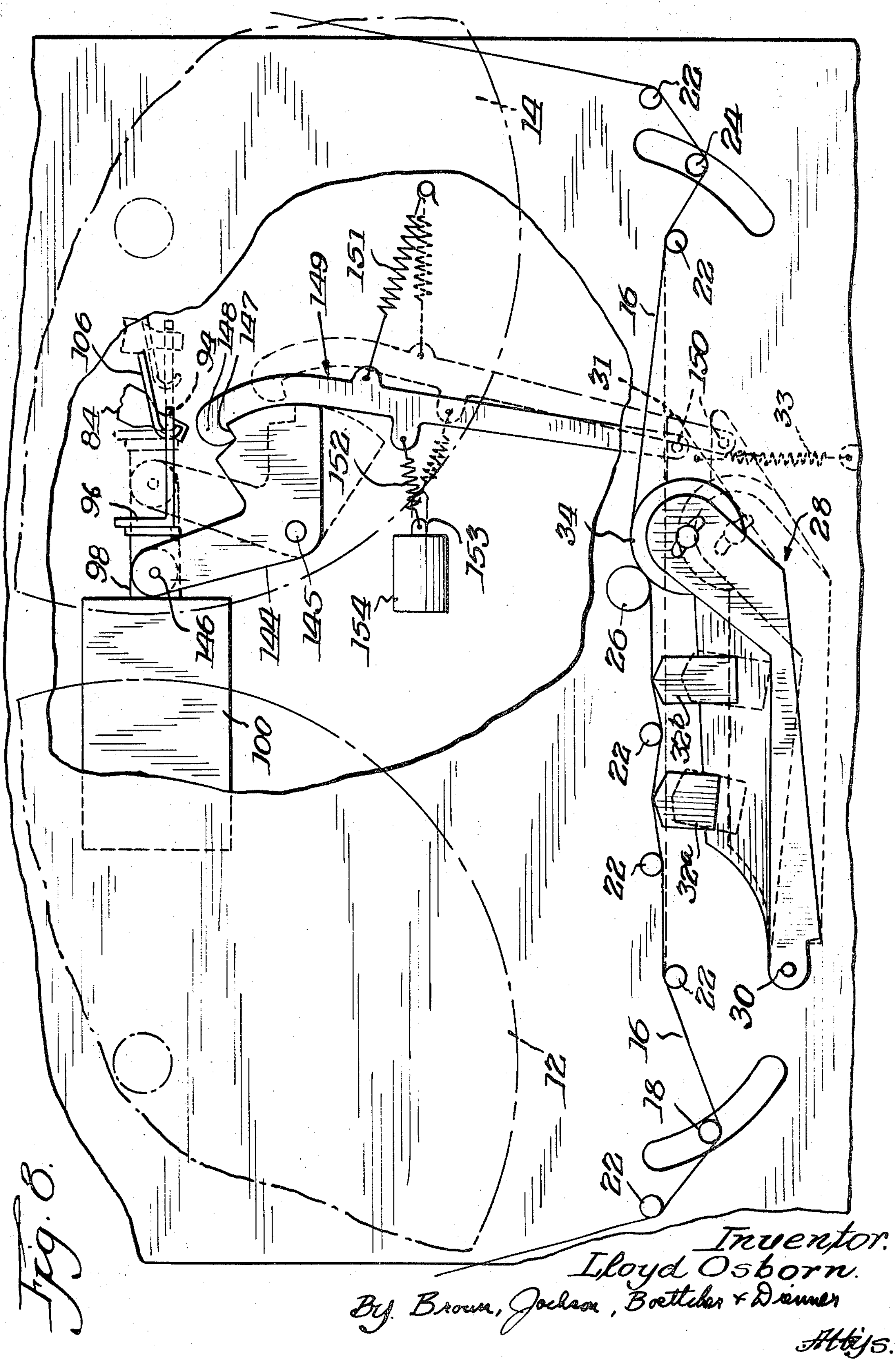
FIG. 8 is a fragmentary view with certain portions broken away showing an alternate arrangement for the controlling the actuation of the pressure roller and of the head bar.

Figure 8 Modification

Referring now to FIG. 8 there is shown in alternate arrangement for controlling the actuation of the pressure roller and the head bar through a mechanical linkage from the armature 98 of the solenoid 100 to provide coordination of movements, in proper timed sequence, of the braking structure, clutching structure, pressure roller and head bar. Since in the fast-forward mode and in the rewind mode it is not desired to actuate the head bar or the pressure roller into their respective engagements with the tape and Capstan, the mechanical linkage has to be disconnectable and reconnectable depending upon the mode of operation desired.

In FIG. 8 the armature 98 is shown in its fully retracted position since the solenoid is energized in response to the user having depressed the play or record button. As a result the bracket 96 carried by the armature has drawn the brake lever 84 to the left (as viewed in FIG. 8) so that the brakes have been disengaged and subsequently the bracket has drawn the link 106 to the left to cause the motor 44 to be drivingly engaged through clutch 50 to the reel support 48 of the takeup reel 14.

As armature 98 is being drawn to the left, bellcrank lever 144, which is pivotally mounted at 145 and has a pivotal engagement 146 at its one end with the armature 98, is swung in a counterclockwise direction about its pivot 145. The other end of the bellcrank lever 144 has a notch providing a shoulder 147 which is adapted to engage the hooked end 148 of a latch bar, indicated generally at 149, if the latch bar is drawn to the left, as viewed in FIG. 8, so as to be in the path of movement of the bellcrank lever when it is moved by armature 98.

Latch bar 149 is urged to the right and downwardly from its full-line position by a spring 151 which is connected by one end to the latch bar and to the deck by its other end. The dotted line position of the bellcrank lever 144 shows it when the solenoid 100 is not energized and shows the latch bar 149 in its position. Latch bar 149 is pivotally connected by its other end at 150 to the extension 31 of the head bar 28 and therefore, when the latch bar is in its retracted position, the pressure roller is out of engagement with the Capstan and the play-record head is out of engagement with the tape. Latch bar 149 is connected by a stiffer spring 152 to the armature 153 of the latch bar solenoid 154.

For the modification of FIG. 8 the circuitry of FIG. 7 is modified slightly by omitting the head switch 97 in line 181 and in line 181 substituting the latch bar solenoid 154 in place of the solenoid 20. As a result, when the user of the tape recorder closes the deck switch 161 and depresses the play button, for example, solenoid 154 is connected to the main line 162 through switch **164*a* and line 181 while, at the same time, solenoid 100 is connected to the main line 162 by switch 165*a* and line 183. Armature 98 of solenoid 100 therefore initially causes the brakes to be released while solenoid 154, through its armature 153 and spring 152, draws the latch bar 149 into the path of the bellcrank lever 144 which is beginning to move in a counterclockwise direction because of its connection at 146 with armature 98. Consequently the hooked end 148 of the latch bar 149 is engaged by the shoulder 147 of the bellcrank lever as it is swung in a counterclockwise direction by movement of armature 98. In this way a direct mechanical linkage is provided between the armature 98 and the head bar 28 instead of relying upon actuation of the head bar 28 by a separate solenoid such as solenoid 20 of FIG. 1. This arrangement of FIG. 8 is desirable when the timing and sequence of movements of the various operating elements must be precise since preciseness cannot be assured if the rate of movement of two solenoids such as 20 and 100** cannot be accurately adjusted or coordinated.

When the stop button is pushed by the user of the tape recorder, the circuit to solenoid 100 is thereby opened and armature 98 is drawn to the right, as viewed in FIG. 8, by spring 115 (which is shown in FIGS. 2 through 6) which acts on the lever 84. This causes bellcrank lever 144 to rotate in a clockwise direction. Consequently, the circuit to the latching solenoid 154 is also opened whereupon spring 151 will act to draw the latch bar 149 away from the bellcrank lever 144 and into the dotted line position of FIG. 8. This results in the pressure roller 34 being disengaged from the Capstan 26 and the play-record head to be drawn from the tape assisted, if necessary, by retraction spring 33. As armature 98 moves to the right, clutch 50 is disengaged and brakes 56 and 58 are applied to the hubs of reel supports 46 and 48. These actions all take place very fast once the stop button is depressed.

By relating the movement of the head bar 28, which carries not only the play-record head but also the pressure roller, with the movement of the clutch 50, it is possible by my invention to start up the tape from zero speed and drive the tape at 30 inches per second without spillage of the tape by using tape tension levers which do not have to accommodate more than about 1½inches of excess tape before the takeup reel is up to speed within one-tenth of a second or less. As a result very little space needs to be devoted to tape tension levers and the area through which they move, with resulting economies of manufacture.

While I have described preferred embodiments of my invention, I do not intend to be limited thereto except insofar as the appended claims are so limited since various modifications or changes will be readily suggested to one skilled in the art having my disclosure before him.

I claim:

1. For use in a tape recorder having a takeup reel, driving means and braking means for said reel, a play-record head and powered tape driving means including a driven Capstan member and a pressure roller member which are relatively movable toward and away from each other, the improvement comprising a clutch structure disposed between the takeup reel and its driving means, and actuating means adapted both to render the clutch structure effective to operatively associate the reel and its driving means and also to render said members effective to drive the tape, together with means responsive to continued movement of the reel, as it is braked by the braking means, for disabling the powered tape driving means.

2. For use in a tape recorder having a takeup reel, driving means and braking means for said reel, a play-record head and powered tape driving means including a driven Capstan member and a pressure roller member which are relatively movable toward and away from each other, the improvement comprising a clutch structure disposed between the takeup reel and its driving means, actuating means adapted both to render the clutch structure effective to operatively associate the reel and its driving means and also to render said members effective to drive the tape, and brake operating means, the said actuating means being operatively associated with said brake operating means to provide release of the braking means prior to rendering said clutch structure and said members effective, together with means responsive to continued movement of the reel, as it is braked by the braking means, for disabling the powered tape driving means.

3. The improvement of claim 2 wherein said actuating means is also adapted to render effective the play-record head.

4. The improvement of claim 2 wherein, upon actuation of said tape recorder to an operating mode said actuating means first provides release of said brakes, and then, if the means responsive to continued movement of the reel, as it is being braked, senses no movement, said actuating means renders effective said clutch structure and said members and said play-record head.

5. For use in a tape recorder having a takeup reel, driving means and braking means for said reel, a play-record and powered tape driving means including a driven Capstan member and a pressure roller member which are relatively movable toward and away from each other, the improvement comprising a clutch structure disposed between the takeup reel and its driving means, and actuating means adapted both to render the clutch structure effective to operatively associate the reel and its driving means, and also to render said members effective to drive the tape, the actuating means comprising the armature of a first solenoid which is actuated when the tape recorder is placed in an operating mode, said armature being connected by linkage to said clutch structure and the armature being adapted to cause actuation of a switch for the circuit of a second solenoid whose armature is operatively associated with one of said relatively movable members and is adapted to move it to render said members effective to drive the tape.

6. For use in a tape recorder having a takeup reel, driving means and braking means for said reel, a play-record head and powered tape driving means including a driven Capstan member and a pressure role roller member which are relatively movable toward and away from each other, the improvement comprising a clutch structure disposed between the takeup reel and is its driving means, and actuating means adapted both to render the clutch structure effective to operatively associate the reel and its driving means, and also to render said members effective to drive the tape, the actuating means comprising the armature of a first solenoid which is actuated when the tape recorder is placed in an operating mode, said armature being connectable by linkage to both the clutch structure and to one os of said relatively movable members.

7. The improvement of claim 6 wherein linkage to the clutch structure includes a lost motion link.

8. The improvement of claim 6 wherein the linkage to said one of said relatively movable members is normally disconnected from said actuating means, and there is means responsive to placing the tape recorder in its play or record mode to cause operative connection of said linkage.

9. The improvement of claim 8 wherein said responsive means comprises a second armature of a second solenoid.

10. The improvement of claim 8 wherein the linkage comprises a latch member which is adapted to operatively connect said one of said relatively movable members to said linkage.

11. The improvement of claim 6 wherein the linkage between the armature and clutch structure comprises a bellcrank lever and a link, said link having a lost motion connection at one end with the armature and at its other end a connection with the bellcrank lever which is operatively connected with the clutch structure.

12. The improvement of claim 6 wherein the linkage between said armature and said one of said relatively movable members comprises a bellcrank lever operatively connected by one end to said armature and by its other end operatively connectable with a latch bar, said latch bar being connected with said one of said movable members.

13. In a tape recorder having powered tape driving means, a reel for tape, and braking means for the reel, the improvement comprising means responsive to continued movement of the reel, as it is braked by the braking means, for disabling the powered tape driving means.

14. In a tape recorder having a powered tape driving means, a reel for tape, and braking means for the reel, the improvement comprising sensing means adapted to sense the continued movement of the reel when the braking means is applied to the reel, and means responsive to the sensing means and adapted to disable the tape driving means so long as movement of the braked reel is sensed by the sensing means.

15. The improvement of claim 14 wherein the responsive means comprises an electrical switch in the circuit of the powered tape driving means.

16. The improvement of claim 15 wherein the sensing means is adapted to maintain the switch open when continued movement of the braked reel is sensed.

17. The improvement of claim 14 wherein the sensing means is operatively associated with and moved by the braking means when the braking means is actuated to brake the reel.

18. The improvement of claim 17 wherein the responsive means comprises a movable switch member in a switching mechanism in the circuit of the powered tape driving means, and wherein the responsive means when moved by the braking means from a predetermined position, disposes the movable switch member in an open circuit position.

19. The improvement of claim 14 wherein the braking means for the reel includes a force dividing link and the sensing means senses movement of said force dividing link during braking of the reel.